(12) United States Patent
Lalor

(10) Patent No.: US 7,267,082 B2
(45) Date of Patent: Sep. 11, 2007

(54) ANIMAL COLLAR

(76) Inventor: Tom Lalor, 122 Garden Avenue, North Vancouver, British Columbia (CA) V7P 3H2

(*) Notice: Subject to any disclaimer, the term of this patent is extended or adjusted under 35 U.S.C. 154(b) by 0 days.

(21) Appl. No.: 11/324,047

(22) Filed: Dec. 30, 2005

(65) Prior Publication Data

US 2006/0112905 A1 Jun. 1, 2006

Related U.S. Application Data

(63) Continuation-in-part of application No. 10/979,714, filed on Nov. 2, 2004, which is a continuation-in-part of application No. 10/634,467, filed on Aug. 5, 2003, now Pat. No. 6,830,014.

(51) Int. Cl.
*A01K 29/00* (2006.01)

(52) U.S. Cl. ................................... 119/859

(58) Field of Classification Search ........ 119/718–721, 119/859, 862, 908, 905; 340/573.1, 573.3
See application file for complete search history.

(56) References Cited

U.S. PATENT DOCUMENTS

| | | | |
|---|---|---|---|
| 5,559,498 A | 9/1996 | Westrick et al. | 340/573 |
| 5,605,116 A | 2/1997 | Kim et al. | 119/720 |
| 5,636,597 A | 6/1997 | Van Curen et al. | 119/720 |
| 5,799,618 A | 9/1998 | Van Curen et al. | 119/721 |
| 5,815,077 A * | 9/1998 | Christiansen | 340/573.3 |
| 5,911,198 A | 6/1999 | Van Curen et al. | 119/720 |
| 5,913,284 A | 6/1999 | Van Curen et al. | 119/720 |
| 5,923,254 A | 7/1999 | Brune | 340/573.3 |
| 5,934,225 A | 8/1999 | Williams | 119/859 |
| D417,835 S | 12/1999 | Williams | D8/356 |
| 6,058,889 A | 5/2000 | Van Curen et al. | 119/721 |
| 6,073,589 A | 6/2000 | Van Curen et al. | 119/720 |
| 6,163,261 A | 12/2000 | Westrick | 340/573.3 |
| 6,184,790 B1 | 2/2001 | Gerig | 340/573.3 |
| 6,327,999 B1 | 12/2001 | Gerig | 119/712 |
| 6,360,697 B1 | 3/2002 | Williams | 119/720 |
| 6,431,122 B1 | 8/2002 | Westrick et al. | 119/721 |
| 6,459,378 B2 | 10/2002 | Gerig | 340/573.3 |
| 6,598,563 B2 * | 7/2003 | Kim et al. | 119/720 |
| 6,606,967 B1 * | 8/2003 | Wolfe et al. | 119/856 |
| 6,712,025 B2 | 3/2004 | Peterson et al. | 119/721 |

* cited by examiner

*Primary Examiner*—Thomas Price
(74) *Attorney, Agent, or Firm*—Jeffrey S. Sokol; Cook & Franke S.C.

(57) ABSTRACT

An electronic animal collar designed to reduce the load applied to the animal=s neck by one or more stimulating electrodes or sensors that extend from or through an inside surface of the collar housing into the skin of the animal during use, and to permit the collar to be securely fastened to the neck of the animal without risk of causing discomfort or damage to the skin of the animal due to pressure from the stimulating electrodes. The inside surface of the collar housing has one or more high point surfaces that are raised to extend the inside surface above the base of the stimulating electrodes or sensors toward the animal during use so as to increase contact between the inside surface and the animal=s skin and to thereby relieve and distribute the load caused by collar tension around the animal=s neck over a larger contact friction area. A connecting strap for connecting the electronic collar to the animal includes a stretchable insert to ensure good electrode/skin contact and provide comfort for the animal.

18 Claims, 8 Drawing Sheets

PRESSURE POINTS

CONTACT FRICTION AREAS

ANIMAL COLLAR

CROSS REFERENCE TO RELATED APPLICATION(S)

This application is a Continuation-In-Part of U.S. Patent application Ser. No. 10/979,714, filed Nov. 2, 2004, which in turn is a Continuation-In-Part of U.S. patent application Ser. No. 10/634,467, filed Aug. 5, 2003 now issued as U.S. Pat. No. 6,830,014 on Dec. 14, 2004.

BACKGROUND OF THE INVENTION

The present description relates to animal collars, and in particular to dog collars of the type that have one or more electrodes or sensors which protrude from the inside surface of the collar for contacting the neck of the animal and electronic devices located within the body of the collar to receive electronic control signals or sensor input and to generate a stimulus, which is transmitted to the animal through the electrodes or by a speaker on the collar.

SUMMARY OF THE INVENTION

Various electronic animal collar-type training aids are known for enabling an animal trainer to encourage or discourage certain behaviour in animals, such as dogs. The devices may be used to discourage barking or digging, or contain the animal within a defined area.

Generally, the trainer uses a transmitter capable of sending electronic signals, such as radio frequency (RF) signals, to a receiver unit contained within a boxlike enclosure strapped around the animal's neck (see FIG. 1—Prior Art). The transmitter unit may be a stationary boundary unit, a stationary centrally located unit, or a portable transmitter carried by the trainer as part of a remote control unit. Also contained within the boxlike enclosure strapped to the animal are a power supply and a signal generator for generating a stimulus (normally an electric stimulus) that is transmitted to the animal through one or more electrodes, which protrude from the inside surface of the boxlike enclosure and press into the neck of the animal. In response to signals received by the receiver from the transmitter, a voltage is applied to the one or more electrodes to provide an electric stimulation to the animal when it exhibits undesirable behaviour. A device of this type is shown in FIG. 1 of the present application and is also shown and described in U.S. Pat. No. 6,327,999, issued to Duane A. Gerig on Dec. 11, 2002.

As shown in FIGS. 1 and 2, currently available animal collars 1 generally comprise a boxlike collar housing 2 attachable to the animal's neck using strap 3. One or more electrodes 4 typically protrude from an inside surface 5 of boxlike collar housing 2 between ⅜ inch (0.95 cm) and ¾ inch (1.9 cm). Electrodes 4 generally have contact points approximately ⅛ inch (0.32 cm) in diameter. One problem with such collars, is that their effectiveness is limited by the amount of contact that can be obtained between electrodes 4 and the animal's skin 6. Getting the proper tension on the collar requires considerable experience and many inexperienced trainers over tighten or under tighten the devices around the animal's neck. The problem with the electronic collars of the prior art is that 90% of the collar tensioning load is concentrated on the tiny electrodes 4, which jab into the animal's neck. This causes animal discomfort, and over time, the electrodes can harm the animal by causing sores. If the collars are worn loosely, sufficient electrode-skin contact can be lost when the animal runs or shakes itself, especially when the animal becomes wet.

So called "no-bark collars" of the prior art are similar to the electronic collars described above, and shown in FIGS. 1 and 2, except, in place of the receiver/transmitter combination, no-bark collars have a bark sensor generally located on inside surface 5. The bark sensor is similar to the one or more electrodes 4 and is designed to contact the animal's neck and detect vibrations associated with barking. When such vibrations are detected, an electric stimulus is transmitted to the animal through the one or more electrodes 4 to deter the barking behaviour.

No-bark collars and other similar collars used in various animal containment systems or animal training systems, suffer from the same disadvantages described above.

It would therefore be advantageous if an electronic collar device was developed that could permit sufficient electrode-skin contact to allow the device be effective, and yet provide comfort to the animal and prevent damage and sores.

It is an object of one aspect of the applicant's animal collar described herein to provide an animal collar that overcomes one or more of the above shortcomings.

It is an object of another aspect to provide an animal collar that reduces and distributes the tensioning load applied to the animal's neck by the stimulating electrodes or sensors.

It is an object of another aspect to provide an animal collar that can be securely fastened to the neck of the animal and that reduces the risk of causing discomfort or damage to the skin of the animal due to pressure from the stimulating electrodes or sensors.

It is an object of a further aspect to provide a strap for attaching an animal collar to an animal, the animal collar having at least one electrode extending toward the animal during use, the strap designed to maintain good electrode/skin contact while at the same time improving animal comfort.

Briefly, the applicant's animal collar described herein provides an electronic animal collar designed to reduce the load applied to the animal's neck by one or more stimulating electrodes or sensors that extend from or through an inside surface of the collar housing into the skin of the animal during use, and to permit the collar to be securely fastened to the neck of the animal without risk of causing discomfort or damage to the skin of the animal due to pressure from the stimulating electrodes. The inside surface of the collar housing has one or more high point surfaces that extend the inside surface above the electrode base and towards the animal so as to relieve and distribute the load caused by collar tension around the animal's neck over a larger contact friction area. The high point surfaces intersect with a notional 90-degree plane extending from any point, located above the electrode or sensor base where it intersects with the inside surface of the collar housing, on a central longitudinal axis of any of the one or more electrodes or sensors. In another aspect, the connecting strap for the applicant's animal collar includes a stretchable insert, which automatically adjusts the collar to the correct tightness regardless of the user's skill in securing the collar to the animal. In addition, the stretchable insert will extend and tighten in response to the animal's movements, such as flexing the neck muscles, heavy breathing or barking, thus maintaining proper collar tension and electrode-skin contact at all times.

According to one aspect of the applicant's animal collar, there is provided an animal collar designed for attachment to an animal, comprising: a collar housing having an inside surface directed toward the animal during use; a first electrode directed toward the animal during use, the first electrode intersecting the inside surface at a first electrode base; and a second electrode directed toward the animal during use, the second electrode intersecting the inside surface at a second electrode base; the inside surface having at least one high point surface extending above at least one of the first electrode base and the second electrode base and toward the animal during use; the at least one high point surface located outside of a central area of the housing, the central area located between the first electrode base and the second electrode base.

According to another aspect of the applicant's animal collar, there is provided an animal collar designed for attachment to an animal, comprising: a collar housing having an inside surface directed toward the animal during use; a first electrode directed toward the animal during use, the first electrode intersecting the inside surface at a first electrode base, the first electrode having a first central longitudinal axis extending toward the animal during used from the first electrode base to an opposite first distal end; and a second electrode directed toward the animal during use, the second electrode intersecting the inside surface at a second electrode base, the second electrode having a second central longitudinal axis extending toward the animal during used from the second electrode base to an opposite second distal end; the inside surface having at least one high point surface designed to intersect with a notional 90-degree plane extended from a point on at least one of the first central longitudinal axis and the second longitudinal axis; the at least one high point surface located outside of a central area of the housing, the central area located between the first electrode base and the second electrode base.

According to a further aspect of the applicant's animal collar, there is also provided an animal collar designed for attachment to an animal, the collar having a stimulating unit for generating a stimulus and first and second electrodes directed toward the animal during use for transferring the stimulus to the animal, the collar comprising: a collar housing for containing the stimulating unit and for supporting the electrodes, the collar housing having an inside surface designed for contacting the skin of the animal during use, the first electrode intersecting the inside surface at a first electrode base, and the second electrode intersecting the inside surface at a second electrode base; the inside surface having at least one high point surface extending above at least one of the first electrode base and the second electrode base and toward the animal during use; the at least one high point surface located outside of a central area of the housing, the central area located between the first electrode base and the second electrode base.

In other aspects, the connecting strap may include a buckle and the stretchable portion may be located in the buckle. The stretchable portion may be a flexible tubing made of polyvinyl chloride (PVC), thermoplastic elastomer (TPE), plastic, or latex. The buckle can be constructed to have a back buckle portion and a front buckle portion wherein the stretchable portion connects the back buckle portion to the front buckle portion. The buckle may also include a stop means for limiting the distance the stretchable portion can be stretched, and the stop means may be a string connected between the front buckle portion and the back buckle portion.

One advantage of the applicant's animal collar is that it reduces the load applied to the animal's neck by the stimulating electrodes or bark sensor. A further advantage of the applicant's animal collar is that it can be securely fastened to the neck of the animal without risk of causing discomfort or damage to the skin of the animal due to pressure from the stimulating electrodes or sensor. Another advantage of the applicant's animal collar is that the stretchable portion of the connecting strap automatically adjusts the collar to the correct tightness regardless of the user's skill in securing the collar to the animal. Yet another advantage is that the stretchable portion of the connecting strap will extend and tighten in response to the animal's movements, such as flexing the neck muscles, heavy breathing or barking, thus maintaining proper collar tension and good electrode-skin contact at all times.

Further objects and advantages of the applicant's animal collar will be apparent from the following description, wherein various embodiments of the applicant's animal collar are clearly described and shown.

BRIEF DESCRIPTION OF THE DRAWINGS

In the drawings that illustrate the applicant's animal collar by way of example.

DETAILED DESCRIPTION OF THE INVENTION

Figure 1:
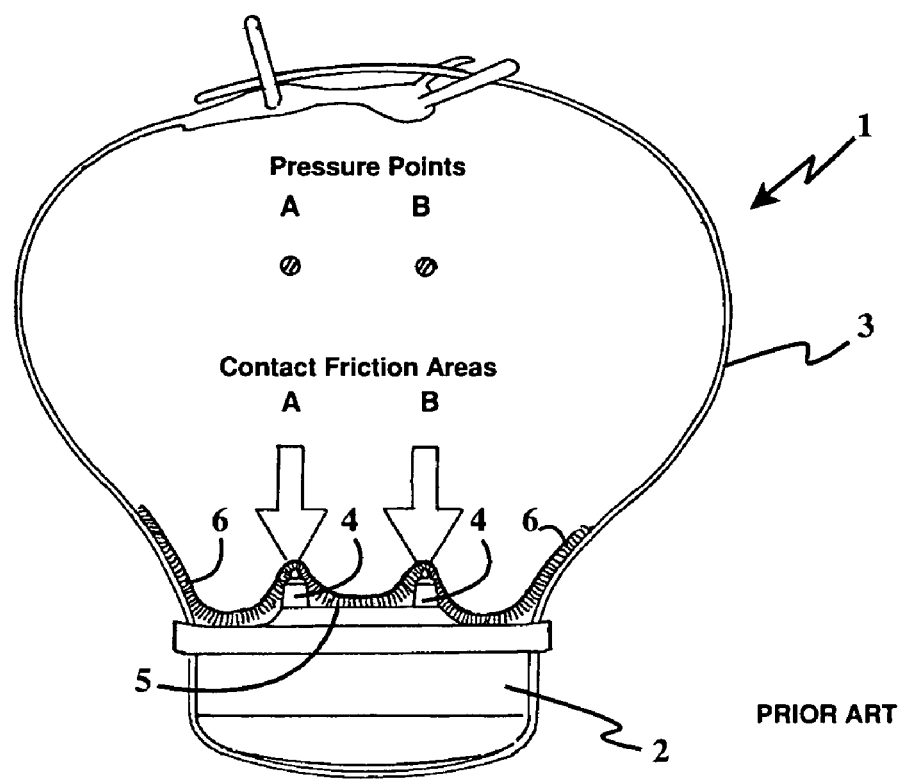
FIG. 1 shows a front side view of an electronic animal collar of the prior art.

FIG. 1 shows an electronic animal collar 1 common to the prior art and designed for attachment to the neck of an animal, such as a dog. Collar 1 typically has a boxlike collar housing 2 attachable by a connecting strap 3 to the neck of an animal, and supporting one or more electrodes or sensors 4 on a flat inside surface 5 thereof. Electrodes 4 make contact with the skin 6 of the animal at pressure points A and B when the collar I is attached to the animal's neck. Pressure points A and B also represent contact friction areas between the animal's skin 6 and collar housing 2. The boxlike collar housing 2 contains the necessary electronic components for the proper functioning of the collar, including for example, a receiving unit for receiving electronic control signals, such as RF signals, from a remote transmitter, a power supply, and a stimulating unit for generating an electric stimulus, which is delivered to the animal through electrodes 4 in response to the received electronic control signals. In an electronic no-bark collar of the prior art, a bark sensor, similar to the one or more electrodes 4, is used in place of the receiver/transmitter combination. The bark sensor detects vibrations due to barking and signals the stimulating unit to issue an electric stimulus to the animal through electrodes 4.

Figure 2:
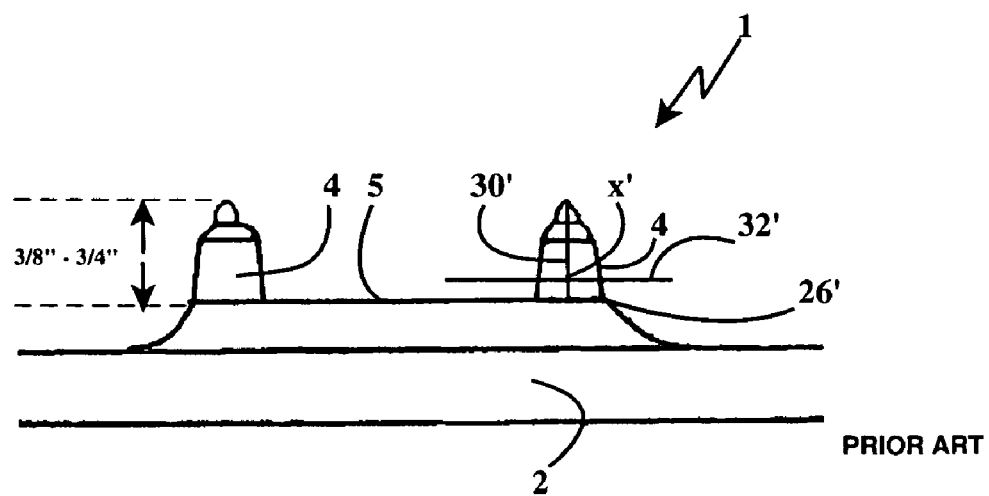
FIG. 2 shows an enlarged front side view of the electrodes and inside surface of the electronic animal collar of the prior art shown in FIG. 1.

FIG. 2 is an enlargement of the one or more electrodes or sensors 4 shown in FIG. 1, illustrating that in the prior art the one or more electrodes or sensors 4 typically protrude above inside surface 5 between ⅜ inch (0.95 cm) and ¾ inch (1.9 cm).

Figure 3:
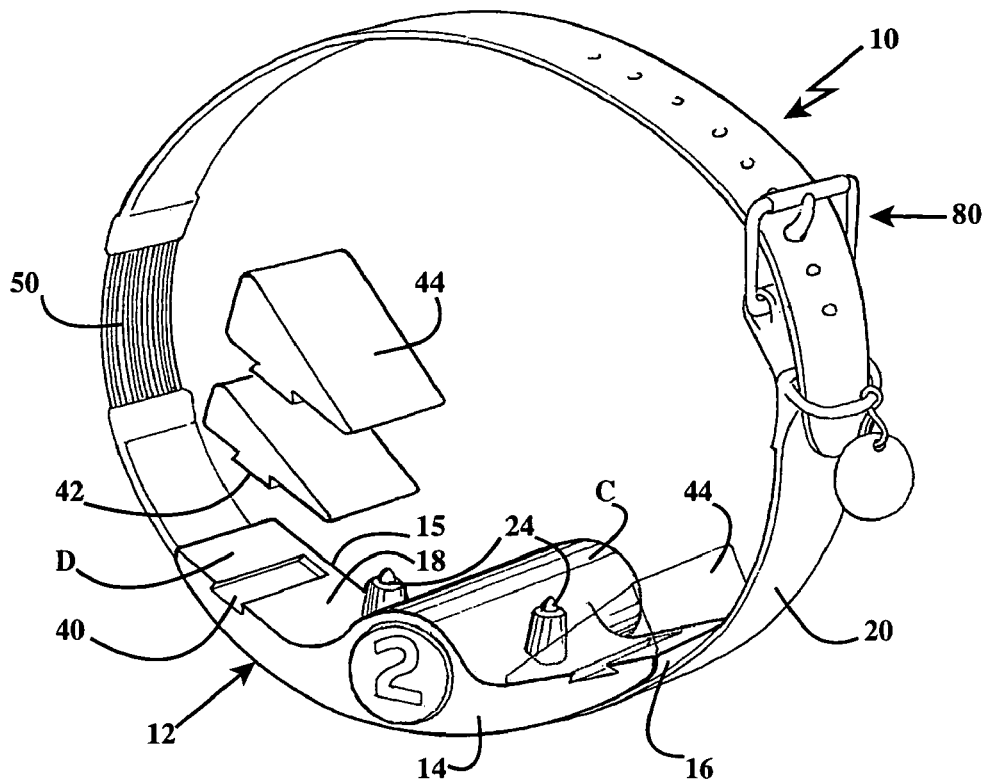
FIG. 3 is a perspective view of one embodiment of the applicant's animal collar showing attachment to a connecting strap and the location of side inserts in exploded fashion.

FIGS. 3 through 9 illustrate one embodiment of the applicant's improved animal collar 10, which is designed for attachment to the neck of an animal, such as a dog, using a connecting strap 20 and buckle 80 (see FIG. 3). As in the prior art collar 1 shown in FIGS. 1 and 2, collar 10 includes a collar housing 12 for containing a receiving unit 62 (see FIG. 10), a stimulating unit 72 (see FIG. 12), and a power supply (not shown). Depending on the various functions of collar 10, collar housing 12 may also contain other devices, such as an audio storage device 68 (see FIG. 12) and a collar speaker 60 (see FIGS. 6, and 10-14.) If collar 10 is a no-bark collar, collar housing 12 may not contain receiving unit 62, but instead will include a bark sensor 90 (see FIG. 14).

Collar housing 12 generally has a front surface 14, an opposing back surface 15, an outside surface 16, which faces away from the animal during use, and an inside surface 18, which faces inwards toward the animal and is designed for contacting the skin of the animal during use when the collar is attached to the animal's neck. Generally, collar housing 12 is contoured, as shown in FIG. 3, to fit the curvature of the animal's neck, but one skilled in the art will appreciate that other configurations are possible so long as the improved supporting high point surfaces C, D, and E, as described herein below, are included.

One or more electrodes or sensors 24 extend through or are supported on inside surface 18. For convenience, the applicant's animal collar is generally shown having two electrodes 24, however, those skilled in the art will appreciate that more or fewer electrodes or sensors are possible. For example, a typical no-bark collar may have two electrodes 24 for delivering electric stimulation to the animal and one bark sensor 90 (see FIG. 14), for sensing vibrations generated by barking, extending through or supported on inside surface 18. In general, reference in this application to one or more electrodes shall include one or more sensors, such as bark sensors.

Figure 4:
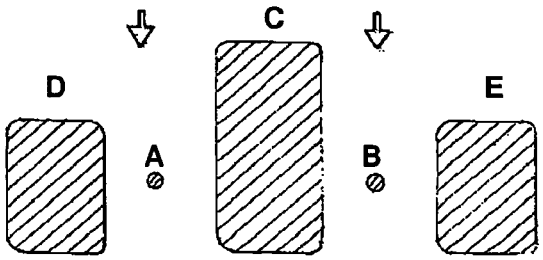
FIG. 4 is a front view of the applicant's animal collar, with side inserts installed, showing the location of pressure points and contact friction areas with the skin of the animal.
Figure 4:
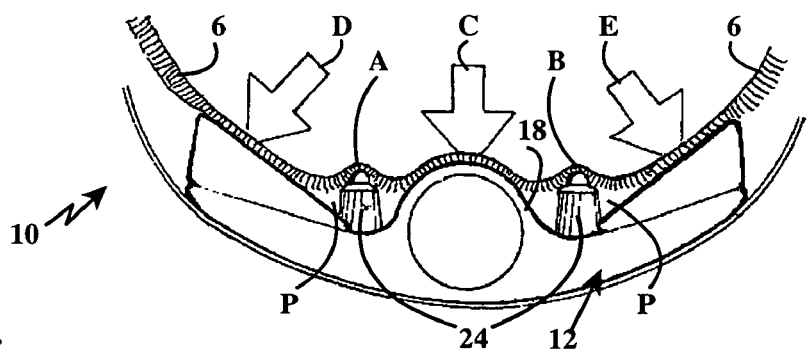
Figure 5:
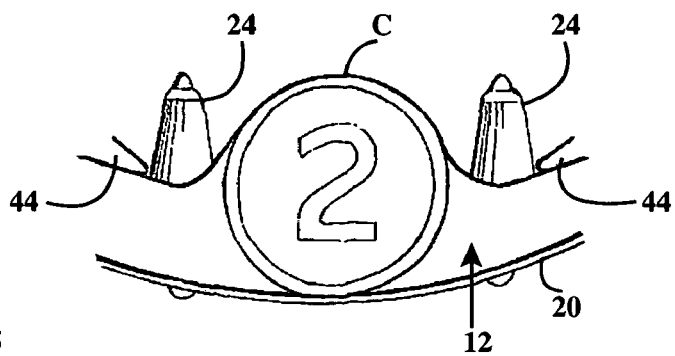
FIG. 5 is an enlarged front view of the electrodes and central high point surface of the collar shown in FIG. 4.
Figure 7:
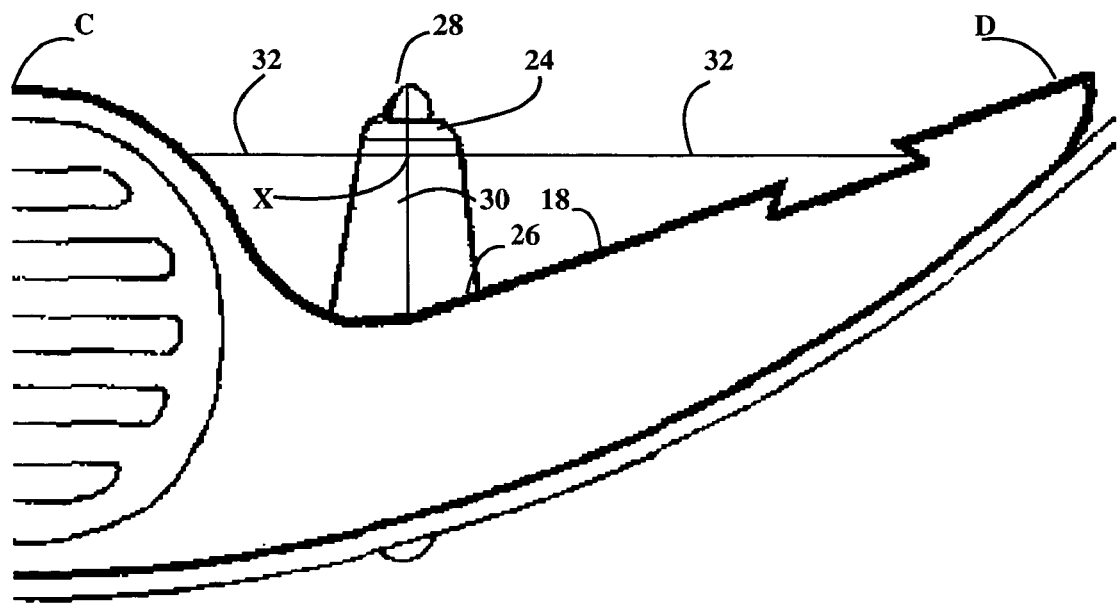
FIG. 7 is an enlarged rear view of one of the electrodes shown in FIG. 6.
Figure 8:
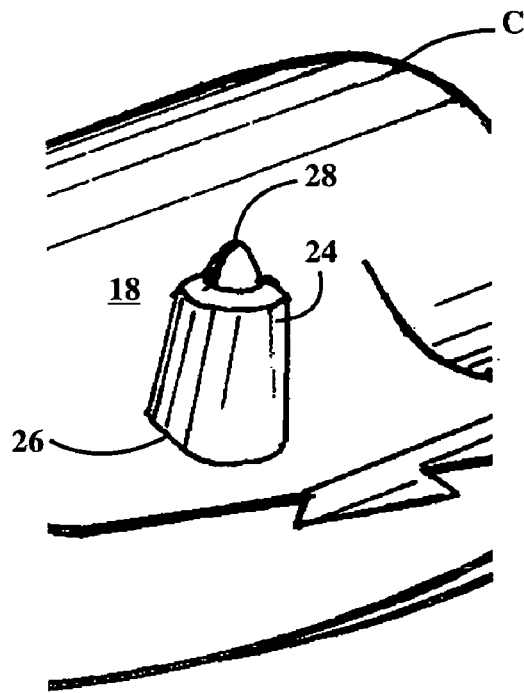
FIG. 8 is an enlarged perspective view of one of the electrodes shown in FIG. 3.

Referring specifically to FIGS. 7 and 8, electrode 24 (or sensor 90 as the case may be) has an electrode base 26 located at the intersection of inside surface 18 and electrode 24, a opposite distal tip 28 for making contact with the animal's skin 6, and a central longitudinal axis 30. As shown in FIG. 4, electrodes 24 make contact with the skin 6 of the animal at pressure points A and B when collar 10 is attached to the animal's neck.

As shown graphically in FIG. 4, inside surface 18 is designed to also make contact with the skin 6 of the animal during use, for example at high point surfaces C, D, and E. High point surfaces C, D, and E are raised portions of inside surface 18, which extend inside surface 18 above electrode base 26 and towards the animal, so as to increase contact between inside surface 18 and the animal's skin 6 and to thereby relieve and distribute the load caused by collar tension around the animal's neck over a larger contact friction area than in the typical animal collar of the prior art (see FIG. 1). This has two beneficial effects. First, animal comfort is improved and the possibility of developing sores is reduced because less pressure is concentrated on pressure points A and B. Second, collar movement is reduced due to the increased contact friction areas at high point surfaces C, D, and E of inside surface 18. As a result, the collar stays in place on the animal's neck and good skin-electrode contact is maintained.

Good skin-electrode contact is further obtained and maintained by the applicant's animal collar, which directs the animal's skin 6 in the neck area, which is generally relatively loose, into pockets P separating high point surfaces C, D, and E, and electrodes or sensors 24.

Referring to FIG. 7, the one or more high point surfaces C, D, E, are raised portions of inside surface 18 extending above electrode base 26 and towards the animal and are designed to intersect with a notional 90-degree plane 32 extended from any point X, above the level of electrode or sensor base 26, along central longitudinal axis 30 of electrodes or sensors 24, 90.

In the prior art collar 1 shown in FIGS. 1 and 2, inside surface 5 of collar housing 2 is flat and contains no high point surfaces that extend above an electrode or sensor base 26' toward the animal during use. In the prior art collar of FIGS. 1 and 2, there are no high point surfaces on inside surface 5 that will intersect with a notional 90-degree plane 32' extended from any point X, above the electrode or sensor base 26', along a central longitudinal axis 30' of electrodes or sensors 4. In the prior art collars, most of the collar tensioning load is concentrated on the pressure points A and B of electrodes or sensors 4.

The advantage of having one or more raised high point surfaces C, D, E, in the applicant's animal collar, is that these high point surfaces relieve the pressure applied to electrode pressure points A and B and distribute the collar tensioning load over a larger contact friction area, as shown in FIG. 4, thus improving animal comfort and reducing the possibility of sores and injury. It also permits collar 10 to be secured to the animal with greater force so as to improve electrode-skin contact and minimize the possibility that the collar will shift as a result of animal movements.

The presence of one or more high point surfaces C, D, E, on inside surface 18, regardless of their number or dimensions, will improve the performance of collar 10 when compared to the prior art collar 1, where inside surface 5 is flat (see FIGS. 1 and 2). Nevertheless, it is preferred that high point surfaces C, D, E, of inside surface 18 extend as high as possible relative to electrode base 26 and are as broad as possible, while at the same time permitting adequate skin-electrode contact. As shown in FIG. 4, the animal's skin 6 must be able to extend into pockets P formed between electrodes or sensors 24 and high point surfaces C, D, E.

Figure 9:
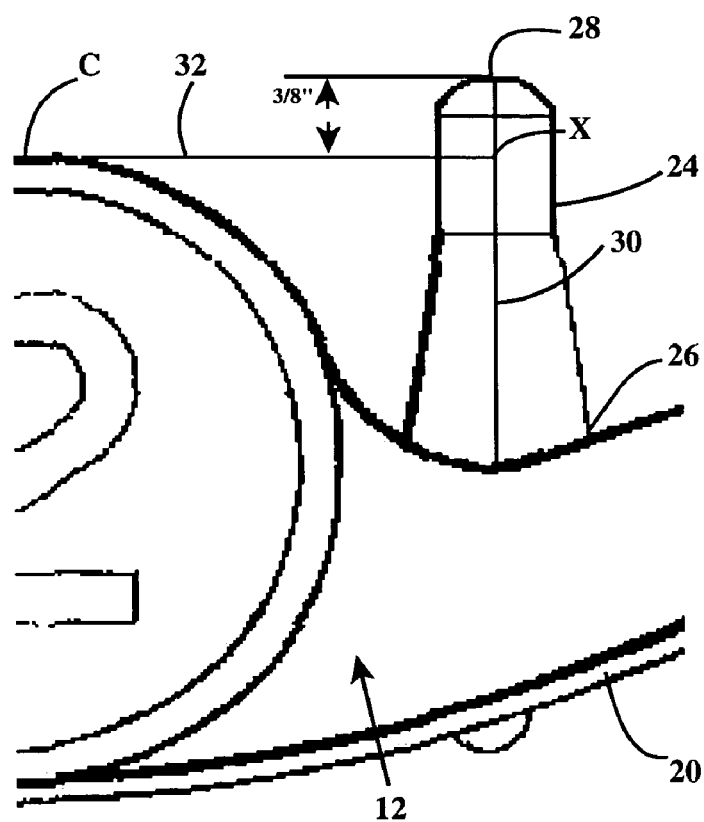
FIG. 9 is an enlarged front view of one of the electrodes of the applicant's animal collar, extending above a central high point surface of the collar.

Referring to FIG. 9, the applicant has found it advantageous if collar housing 12 is designed so that the point X on longitudinal axis 30, from which notional 90-degree plane 32 is extended, is located less than 3/8 inch (0.95 cm) down from distal end 28 of the one or more electrodes 24. That is, distal end 28 of electrodes 4 should not extend above high point surfaces C, D, E by more than 3/8 inch (0.95 cm).

Figure 6:
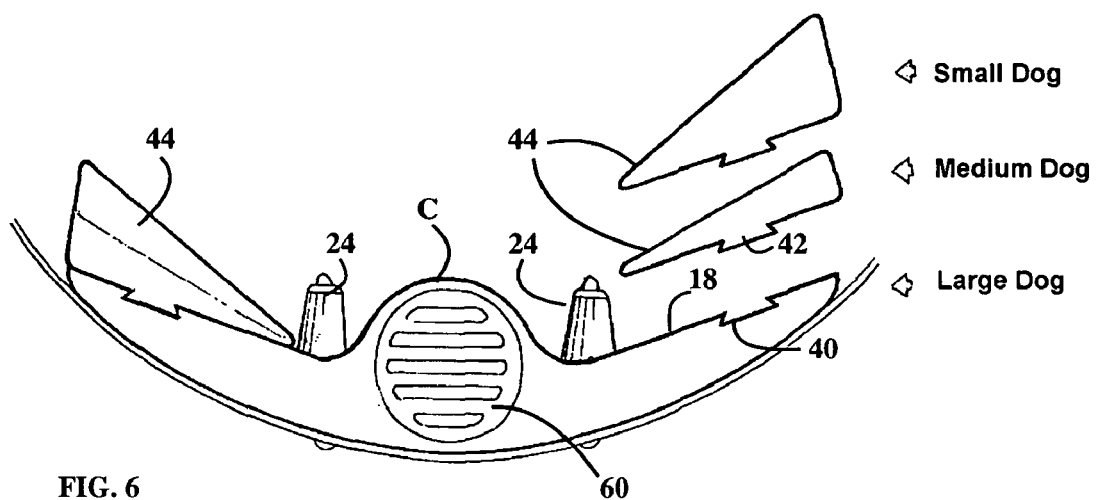
FIG. 6 is a rear view of the applicant's animal collar showing the attachment of side inserts in exploded fashion.

Referring to FIGS. 3 and 6, inside surface 18 of collar housing 12 may include one or more flanged notches 40 designed to mate with oppositely flanged projections 42 on the bottom of wedge-shaped adjustment wings 44. Adjustment wings 44 can be any suitable shape and are attached to collar housing 12 to raise the effective height of high point surfaces C, D, E on inside surface 18 relative to electrodes or sensors 24, thereby increasing animal comfort when collar 10 is attached to the animal's neck. Adjustment wings 44 are used particularly when attaching collar 10 to animals having smaller radius necks. Depending on the size of the animal's neck, multiple adjustment wings 44 can be used to improve fit and comfort. Those skilled in the art will appreciate that other equivalent means of attaching adjustment wings 44 to collar housing 12 can be conceived and all such equivalent means are believed to be within the scope of the applicant's animal collar as described herein.

The applicant has found that one problem with existing electronic dog collars is attaining and maintaining sufficient contact between electrodes 24 and the animal's skin 6 (see FIG. 4). If good electrode/skin contact is not maintained it results in an open circuit condition, which prevents transmission of the electric stimulus from the stimulating unit to the animal through electrodes 24. Attempts have been made to solve this problem by using electronic methods, including using a low impedance transformer.

One cause of this problem in electronic dog collars is that many people are unable to properly tighten the collar to ensure good electrode/skin contact. Most people simply tighten the strap in the middle of the neck. However, since a dog's neck is generally larger at the base than at the top, when the dog runs the collar may move up causing a loss of good electrode/skin contact, resulting in an open circuit condition. Dog owners can solve this problem by tightening the strap around the smallest portion of the dog's neck, up under the ears of the dog. However, the problem with this solution is that, because such placement of the collar is uncomfortable for the dog, most owners are reluctant to attach the collar in this position.

A further cause of this problem with the conventional electronic dog collar, is that many people are unable to determine how tight the collar needs to be fitted to the animal to maintain sufficient electrode/skin contact. The collar needs to be tight enough to maintain good contact, but yet not so tight that the animal chokes. This is a difficult skill to master.

Yet another cause of this problem is that some dogs who have become accustomed to being fitted with electronic collars learn that if they expand their neck when the collar is being attached, all they need to do to avoid receiving a painful electric stimulus is contract their neck muscles at the appropriate time to break the electrode/skin contact.

To solve the problem of attaining and maintaining good electrode/skin contact in an electronic animal collar, to further improve collar comfort and versatility, and to avoid causing discomfort or choking the animal, connecting strap 20 may include a stretchable elastic insert 50 (see FIG. 3), which automatically adjusts collar 10 to the correct tightness regardless of the user's skill in securing the collar to the animal. One significant problem with electronic animal collars of the prior art results from the cone-like shape of the animal's neck, which is thicker at the body than at the head. When attaching the collar to the animal, users tend to slide the collar down and place it near the base of the animal's neck in the hope of there being less chance of the collar shifting downward further. Unfortunately, regular electronic collars attached in this manner will shift upwards on the animal's neck, becoming loose and may slide around to the side. Elastic insert 50 automatically adjusts for the cone shape of the animal's neck to maintain the correct electrode-skin contact and prevent the collar from shifting upward to a smaller diameter area of the neck. In addition, elastic insert 50 will extend and tighten in response to the animal's movements, such as flexing the neck muscles, heavy breathing or barking, thus maintaining proper collar tension and electrode-skin contact at all times. Elastic insert 50 may be made of any suitable elastic material having the desired stretch properties. The strength of elastic insert 50 must be sufficient to attain sufficient electrode/skin contact at the narrowest point of the animal's neck, but not so strong as to choke the animal during use.

Figure 15:
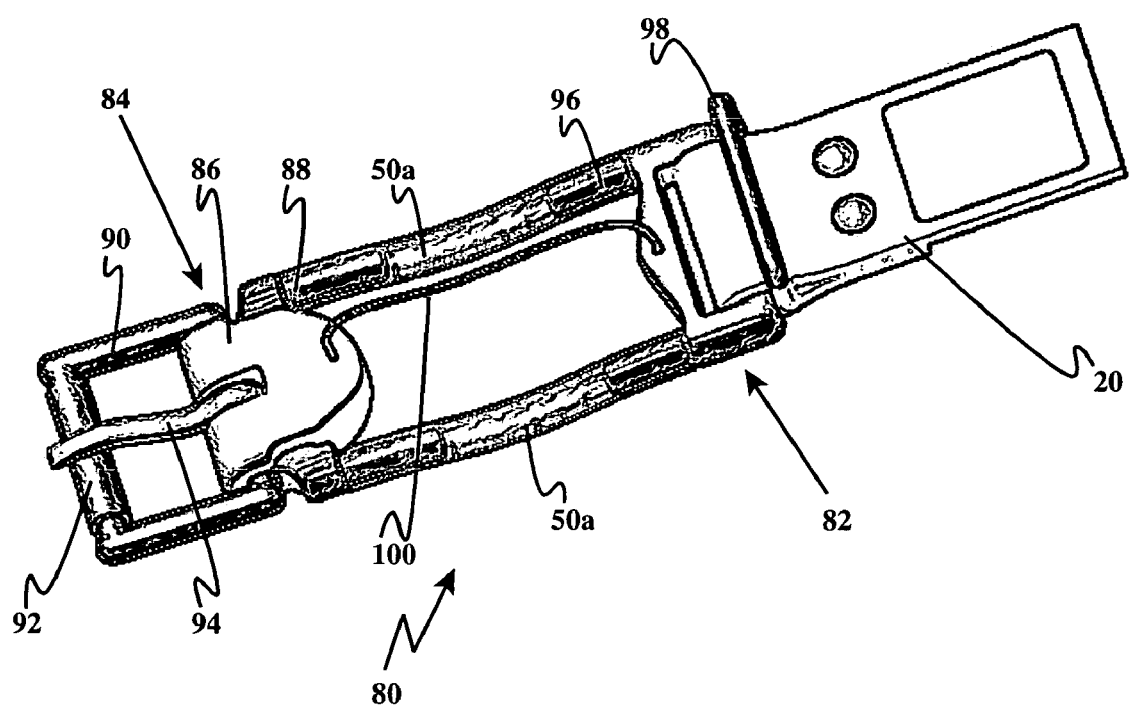
FIG. 15 is a perspective view of a buckle attached to a connecting strap of another embodiment of the applicant's animal collar.

In another embodiment of the applicant's animal collar, as shown in FIG. 15, stretchable inserts 50a are located in the buckle 80 rather than in the strap 20 of electronic collar 10. Buckle 80 is permanently secured to one end of strap 20 and is used in the standard manner to secure strap 20 and collar 10 around the animal's neck. In this embodiment, buckle 80 includes a back buckle portion 82 permanently secured to one end of strap 20 and a front buckle portion 84 for attachment to the other end of strap 20 in the usual manner. Front buckle portion 84 includes an anchor block 86 fixed to a front fork 88. Anchor block 86 is pivotally attached to a buckle frame 90 including a buckle sleeve 92, and a buckle pin 94 is pivotally attached to the buckle frame 92. Back buckle portion 82, includes a back fork 96 pivotally connected to one end of strap 20. A strap ring 98 may also be attached to strap 20 at this point. Two stretchable inserts 50a are located between front fork 88 and back fork 96 to connect the back buckle portion 82 to the front buckle portion 84, thus providing the correct amount of stretch in collar 10 to solve the above-described problem of attaining and maintaining good electrode/skin contact. Stretchable inserts 50a may be made of any suitable stretchable material having the desired stretch properties. As noted earlier, the strength of Stretchable inserts 50a must be sufficient to attain sufficient electrode/skin contact at the narrowest point of the animal's neck, but not so strong as to choke the animal during use or when the collar is moved to a thicker portion of the animal's neck.

The applicant has experimented with many different stretchable materials for connecting front buckle portion 84 to back buckle portion 82, including braided elastic material, flat latex material, and rubber material. The applicant has found that flexible tubing made from Polyvinyl chloride (PVC), Thermoplastic Elastomer (TPE), plastic, or latex works particularly well. In particular, latex tubing having an inside diameter of 3/16 inches, manufactured by Kent Elastomer Products Inc. has been used by the applicant. The appropriate wall thickness of the tubing is selected so as to provide the desired amount of stretch. Such latex tubing over-comes the above-described problems by providing the correct amount of stretch to maintain good electrode/skin contact without causing the animal discomfort or to choke.

The latex tubing is fixed to back fork 96 and front fork 88, using a suitable adhesive. In some cases, depending on the inherent surface friction that may exist between forks 88, 96 and the latex tubing, it may not be necessary to use any adhesive.

In the embodiment shown in FIG. 15, the applicant has used two stretchable inserts 50*a* to connect the back buckle portion 82 to the front buckle portion 84. The reader will appreciate that if the configuration of buckle 80 is altered slightly, it may be possible to use a single stretchable insert or more than two stretchable inserts in substitution for the two stretchable inserts 50*a* shown in FIG. 15. Alternatively, a suitable spring or springs could be used, or a shock absorber device connected between back buckle portion 82 and front buckle portion 84, would perform the same function.

In the embodiment shown in FIG. 15, buckle 80 also includes a backup string 100 connected between front buckle portion 84 and back buckle portion 82. Backup string 100 is cut to a desired length so as to limit or stop the total amount of stretch permitted for stretchable inserts 50*a* and can made from any lightweight, rigid, non-stretch material such as nylon. Once stretchable inserts 50*a* have been stretched a certain selected amount, backup string 100 will prevent further stretching, thereby limiting the amount of tension that can be placed on the collar when attaching it to the animal. This prevents an inexperienced owner from over tightening the collar and causing discomfort to the animal. Backup sting 100 will also prevent the collar from coming off the animal should the stretchable inserts 50*a* fail. The reader will appreciate that other suitable means can be substituted for backup string 100 and used to stop or limit the amount by which stretchable inserts 50*a* can be stretched. For example, a sliding telescopic bar could be connected between front buckle portion 84 and back buckle portion 82. The sliding bar would permit only the desired amount of stretch before stopping further movement.

The stretchable inserts 50 and 50*a* described herein by the applicant are design specifically for use on electronic animal collars of the type having at least one electrode 24 extending toward the animal during use for transferring a stimulus to the animal. The electronic animal collar may have a housing for containing a stimulating unit for generating an electric stimulus, which is directed to the animal through the electrode or electrodes 24. The housing may include a receiver unit for receiving signals from a transmitter to control when the stimulus is to be administered. Stretchable inserts 50 and 50*a* are designed to maintain good electrode/skin contact so as to improve the function of the electronic animal collar and provide comfort for the animal. Stretchable inserts 50 and 50*a* are not designed or intended for use on a regular animal collar used for attachment to a leash for restraining or leading the animal.

Figure 10:
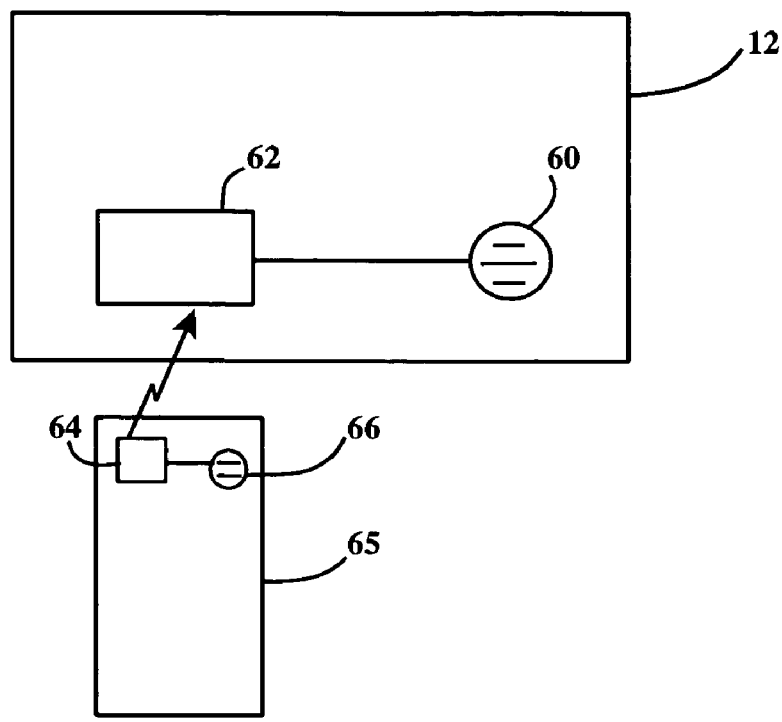
FIG. 10 is a schematic view of a further embodiment of the applicant's animal collar including a receiver and a collar speaker, and a remote control unit including a microphone and a transmitter for transmitting audio commands to the animal.
Figure 11:
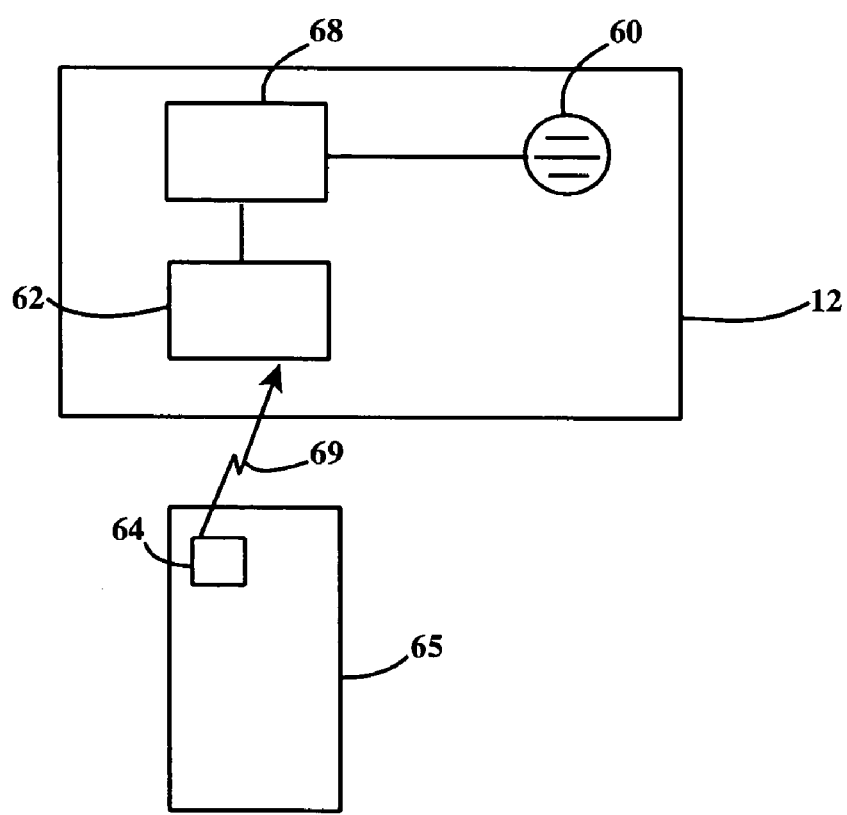
FIG. 11 is a schematic view of another embodiment of the applicant's animal collar including an audio storage device for storage of audio commands.

Referring to FIGS. 6, 10 and 11, collar speaker 60 may be included within collar housing 12 for use in issuing audio commands to the animal in response to signals received from a remote transmitter 64 contained within a remote control unit 65. In one embodiment, a microphone 66 on remote control unit 65 picks up audio commands from a trainer. The commands are transmitted by transmitter 64 using permitted radio frequencies, received by receiver 62 contained within collar housing 12, and played over collar speaker 60. In an alternative preferred embodiment, as shown in FIG. 11, collar housing 12 may include audio storage device 68, such as an electronic memory chip, a micro recorder/player, or any similar device, containing pre-recorded audio commands or sounds familiar to the animal. Instead of transmitting the actual audio, the trainer uses remote control unit 65 and transmitter 64 to send an activation code 69 corresponding to one of the pre-recorded audio commands or sounds contained within audio storage device 68. Receiver unit 62 receives activation code 69 and causes the corresponding audio command or sound from storage device 68 to be played over collar speaker 60.

Figure 12:
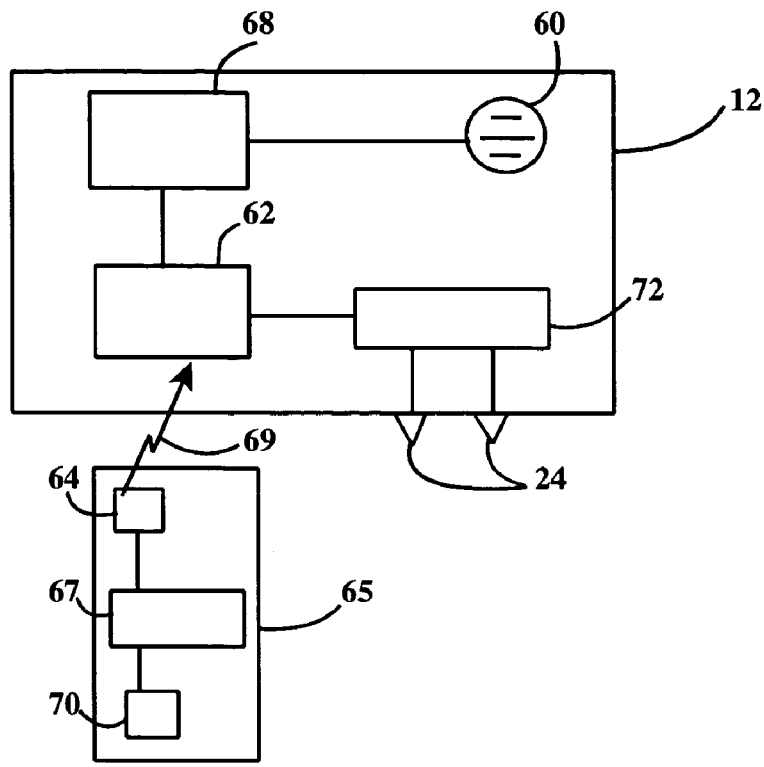
FIG. 12 is a schematic view of another embodiment of the applicant's animal collar including a vibration sensor on the remote control unit.

In a further aspect of the applicant's animal collar, as shown in FIG. 12, the above-described stored sounds, or an electric stimulus applied through electrodes 24, can be activated simply by tapping or sharply striking remote control unit 65. As a result, remote control unit 65 can be kept in the user's pocket and need not be removed for operation. This can be advantageous, for example, when hunting with a dog in the field where it may be raining or cold and the hunter does not want to carry remote control unit 65 in his hand, or remove a glove to activate the control unit buttons. It is also a safety feature, since it can be dangerous to handle both a gun and the remote control unit at the same time.

In this aspect of the applicant's animal collar, as shown in FIG. 12, remote control unit 65 includes a vibration sensor 70 connected to a microprocessor 67 including memory. Vibration sensor 70 is capable of detecting when remote control unit 65 has been struck sharply or tapped by a user. In response to the tap, microprocessor 67 uses transmitter 64 to send an activation code 69 to receiver 62, which initiates playback of one of the stored audio commands or sounds, or causes an electric stimulus to be sent from stimulating unit 72 to the animal through electrodes 24. Vibration sensor 70 may be any suitable device capable of detecting vibrations produced by a sharp strike or tap of remote control unit 65, such as an accelerometer, a piezoelectric crystal, or any device which measures strain wave propagation.

Microprocessor 67 can be programmed to send the appropriate activation code 69 for audio playback, or electric stimulus, depending on the number and sequence of taps detected by vibration sensor 70. Remote control unit 65 may also include a means to prevent sending the activation code 69 upon accidental activation. For example, after detecting a tap, remote control unit 65 can be configured to issue a confirmatory signal, such as a sound tone or a voice reply or a vibration that the user can feel. Activation code 69 will not be sent until the user replies to the confirmatory signal with one or more taps within a specified period.

Figure 13:
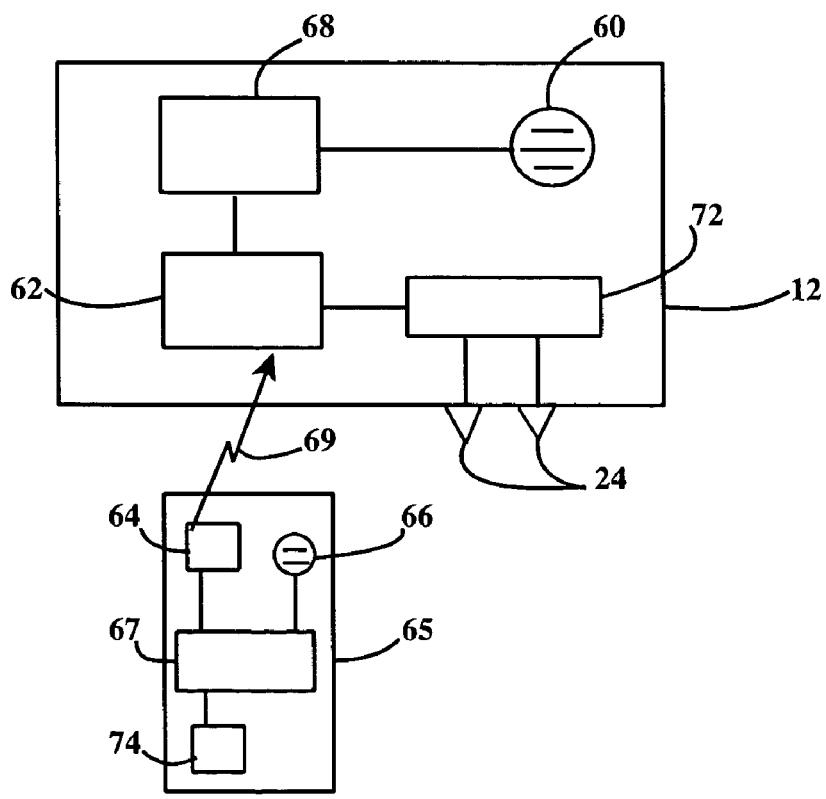
FIG. 13 is a schematic view of another embodiment of the applicant's animal collar including voice recognition circuits and a microphone on the remote control unit.

In an alternate embodiment of this aspect of the applicant's animal collar, as shown in FIG. 13, vibration sensor 70 is replaced with voice recognition circuits 74 and microphone 66. Upon receipt of the correct voice commands from the user the corresponding activation code 69 is sent to receiver 62, which initiates playback of one of the stored audio commands or sounds or causes an electric stimulus to be sent from stimulating unit 72 to the animal through electrodes 24.

Figure 14:
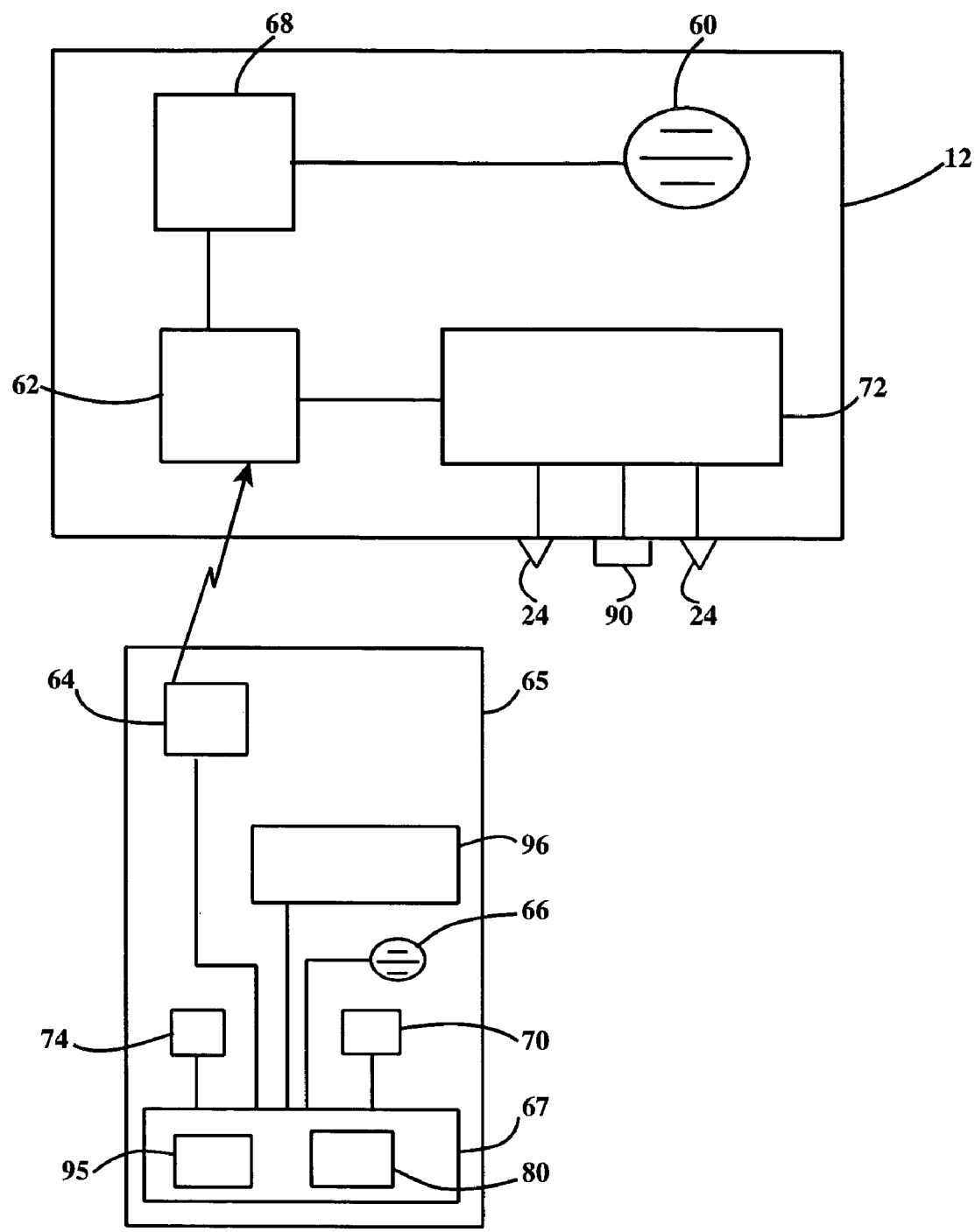
FIG. 14 is a schematic view of another embodiment of the applicant's animal collar including an option control program and an advertising program on a microprocessor of the remote control unit.

In a further aspect of the applicant's animal collar, as shown in FIG. 14, remote control unit 65 includes microprocessor 67 having an option control program 80, which can be used to activate or deactivate features and components of collar 10 and remote control unit 65. In this aspect of the applicant's animal collar, collar 10 and remote control unit 65 can be manufactured to include all of the features and components describe above, including bark sensor 90, collar speaker 60, receiver 62, audio storage device 68, stimulating unit 72, electrodes 24, vibration sensor 70, microphone 66, and voice recognition circuits 74. Due to economies of scale, manufacturing large numbers of collars 10 and remote control units 65 containing all of these components can be cost effective when compared to manufacturing smaller numbers of the devices containing differing combinations of components. At the time of purchase, the user simply identifies the desired features and pays the corresponding fee. The vendor enters an option code into remote control unit 65 corresponding to the desired features, and option control program 80 activates the corresponding components and controlling circuitry. The option code could be determined, for example, by the serial number of remote control unit 65 so that no two collars would have the same option code for the same features. For example, initially the user may not wish to purchase the no-bark feature of the collar, but may want to have the ability to control the collar by tapping remote control unit 65 or using voice commands. In this scenario, the vendor enters an option code into remote control unit 65 to active vibration sensor 70 or voice recognition circuits 74 (or both) permitting the user to control the collar by tapping remote control unit 65 or with voice commands.

One significant advantage of this aspect of the applicant's animal collar is that it gives the user considerable flexibility in his purchase. New features can be added by a user at any time by paying the appropriate fee and requesting the corresponding option code. In the above scenario, the user may later decide to add the no-bark feature by requesting and paying for the corresponding option code. The option code is entered into remote control unit 65 and transmitted to collar 10 to activate bark sensor 90. To add further convenience, the option code may be provided to the user by telephone or over the Internet once payment is confirmed. One further advantage of this aspect of the applicant's animal collar is that a vendor no longer has to maintain an inventory of collars having different features and components. The vendor simply stocks one collar at the lowest price. If additional features are sold, the appropriate option codes are entered and additional fees are collected from the purchaser and paid to the manufacturer.

In another aspect of the applicant's animal collar, as shown in FIG. 14 as well, microprocessor 67 includes an advertising option program 95 and remote control unit 65 includes a display 96 for displaying advertising corresponding to the particular vendor selling the collar. Advertising option program 95 may be configured to cause certain advertising to appear in display 96 at a predetermined time or upon use of a selected feature. For example, at the beginning of duck hunting season, advertising option program 95 can cause the display of a coupon offering a discount on duck hunting products. The type of advertising displayed will be unique to each vendor and will be stored in the memory of microprocessor 67 at the time of manufacturer. At the time of shipping to a vendor, an advertising option code corresponding to that vendor is entered into microprocessor 67 to select the corresponding advertising for that vendor.

It will be appreciated by those skilled in the art that it is possible to design various configurations of the collar described herein that increase the contact friction areas between the collar and the animal, while at the same time maintaining good electrode-skin contact. Various such configurations have been illustrated herein by the applicant, but other such designs, that fall within the scope of the applicant's animal collar, as herein described by the applicant, are possible. It is therefore likely that the applicant's animal collar may be embodied in other specific forms without departing from the spirit or essential characteristics of the applicant's animal collar as described herein. The present embodiments are to be considered as illustrative and not restrictive, the scope of the applicant's animal collar being indicated by the appended claims rather than by the foregoing description, and all changes that come within the meaning and range of equivalency of the claims are therefore intended to be embraced therein.

I claim:

1. An animal collar designed for attachment to an animal, comprising:
   a collar housing having an inside surface directed toward the animal during use;
   a first electrode directed toward the animal during use, said first electrode intersecting said inside surface at a first electrode base; and
   a second electrode directed toward the animal during use, said second electrode intersecting said inside surface at a second electrode base;
   said inside surface having at least one high point surface extending above at least one of said first electrode base and said second electrode base and toward the animal during use;
   said at least one high point surface located outside of a central area of said housing, said central area located between said first electrode base and said second electrode base.

2. The animal collar of claim 1, wherein said at least one high point surface is comprised of one or more adjustment wings attachable to said inside surface.

3. The animal collar according to claim 1, wherein said first electrode has a first electrode distal end opposite said first electrode base and extending toward the animal during use, and wherein said second electrode has a second electrode distal end opposite said second electrode base and extending toward the animal during use, and wherein said first electrode distal end and said second electrode distal end are no more than ⅜ inch (0.95 cm) closer to the animal during use than said at least one high point surface.

4. The animal collar according to claim 1, wherein said collar housing is connected to a connecting strap adapted for attaching said collar to the animal.

5. The animal collar according to claim 4, wherein said connecting strap includes an elastic portion for automatically adjusting collar tension during use.

6. The animal collar according to claim 1, wherein said collar housing contains a receiver unit for receiving remote signals, and a stimulating unit for generating an electric stimulus for delivery through said at least one electrode upon receipt of said remote signals.

7. The animal collar according to claim 6, wherein said collar housing further includes a speaker and an audio storage device for issuing pre-recorded audio commands to the animal in response to said remote signals.

8. The animal collar according to claim 6, including a remote control unit comprising a transmitter, a vibration sensor, and a microprocessor, said vibration sensor adapted to detect when said remote control unit has been tapped sharply and said microprocessor adapted to use said transmitter to send said remote signals to said receiver in response to said sharp tap.

9. The animal collar according to claim 8, wherein said microprocessor includes a confirmation means adapted to initiate a confirmatory signal when said vibration sensor detects that said remote control unit has been tapped sharply.

10. The animal collar according to claim 6, including a remote control unit comprising a transmitter, voice recognition circuits, and a microprocessor, said voice recognition circuits adapted to receive and interpret voice commands from a user, and said microprocessor adapted to use said transmitter to send said remote signals to said receiver in response to said voice commands.

11. The animal collar according to claim 8, wherein said collar additionally includes a speaker and an audio storage device for issuing pre-recorded audio commands to the animal in response to said remote signals, and a bark sensor for detecting when the animal barks, and said remote control unit includes voice recognition circuits adapted to receive and interpret voice commands from a user, said microprocessor adapted to use said transmitter to send said remote signals to said receiver in response to said voice commands, said remote control unit including an option control program designed to activate or deactivate said vibration sensor, said voice recognition circuits, said audio storage device, and said bark sensor upon entry of an option code.

12. The animal collar according to claim 1, including a remote control unit for sending electronic signals to said collar, said remote control unit including a display and an advertising option program, said advertising option program adapted for displaying advertising on said display.

13. The animal collar according to claim 12, wherein said advertising to be displayed on said display is selected from a predetermined list of advertising contained within said remote control unit upon entry of an advertising code into said remote control unit.

14. The animal collar according to claim 1, including a remote control unit, said animal collar and said remote control unit including one or more optional features, said remote control unit including an option control program designed to activate or deactivate said one or more optional features upon entry of an option code.

15. An animal collar designed for attachment to an animal, comprising:
a collar housing having an inside surface directed toward the animal during use;
a first electrode directed toward the animal during use, said first electrode intersecting said inside surface at a first electrode base, said first electrode having a first central longitudinal axis extending toward the animal during used from said first electrode base to an opposite first distal end; and
a second electrode directed toward the animal during use, said second electrode intersecting said inside surface at a second electrode base, said second electrode having a second central longitudinal axis extending toward the animal during used from said second electrode base to an opposite second distal end;
said inside surface having at least one high point surface designed to intersect with a notional 90-degree plane extended from a point on at least one of said first central longitudinal axis and said second longitudinal axis;
said at least one high point surface located outside of a central area of said housing, said central area located between said first electrode base and said second electrode base.

16. The animal collar of claim 15, wherein said at least one high point surface is comprised of one or more adjustment wings attachable to said inside surface.

17. An animal collar designed for attachment to an animal, the collar having a stimulating unit for generating a stimulus and first and second electrodes directed toward the animal during use for transferring the stimulus to the animal, the collar comprising:
a collar housing for containing the stimulating unit and for supporting the electrodes, said collar housing having an inside surface designed for contacting the skin of the animal during use, the first electrode intersecting said inside surface at a first electrode base, and the second electrode intersecting said inside surface at a second electrode base;
said inside surface having at least one high point surface extending above at least one of said first electrode base and said second electrode base and toward the animal during use;
said at least one high point surface located outside of a central area of said housing, said central area located between said first electrode base and said second electrode base.

18. The animal collar of claim 17, wherein said at least one high point surface is comprised of one or more adjustment wings attachable to said inside surface.

* * * * *